United States Patent
Engel et al.

(10) Patent No.: US 10,643,133 B2
(45) Date of Patent: May 5, 2020

(54) PROACTIVE EVENT DRIVEN COMPUTING

(75) Inventors: Yagil Engel, Tel Aviv (IL); Zohar Feldman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 1877 days.

(21) Appl. No.: 13/549,478

(22) Filed: Jul. 15, 2012

(65) Prior Publication Data

US 2014/0019398 A1   Jan. 16, 2014

(51) Int. Cl.
*G06N 5/02* (2006.01)
*G06Q 10/06* (2012.01)

(52) U.S. Cl.
CPC .......... *G06N 5/02* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 7,895,323 B2 | 2/2011 | Gipta et al. | |
| 2006/0106743 A1* | 5/2006 | Horvitz | 706/21 |
| 2006/0195373 A1* | 8/2006 | Flaxer et al. | 705/35 |
| 2007/0208495 A1* | 9/2007 | Chapman et al. | 701/117 |
| 2008/0091384 A1 | 4/2008 | Subramanian et al. | |
| 2008/0177621 A1* | 7/2008 | Abe et al. | 705/10 |
| 2009/0306866 A1* | 12/2009 | Malikopoulos | 701/59 |
| 2011/0106509 A1* | 5/2011 | Mercier et al. | 703/2 |
| 2011/0131588 A1 | 6/2011 | Allam et al. | |

OTHER PUBLICATIONS

Etzion and Niblett, "Event Processing in Action", Manning Publications Co, Aug. 2010.
Engel and Etzion, "Towards Proactive Event Driven Computing", Proceeding DEBS, '11 Proceedings of the 5th ACM international conference on Distributed event-based system, pp. 125-136, Jul. 11-15, 2011.

* cited by examiner

*Primary Examiner* — Jeffrey A Gaffin
*Assistant Examiner* — Mikayla Chubb (57) ABSTRACT

A method for predicting a future situation based on an analysis of at least one predictive pattern. The method comprises monitoring a plurality of events carried out by an event processing component, detecting a predictive pattern predictive of a future situation, selecting one of a plurality of proactive actions and an execution time according to its effect on at least one of a probability of occurrence and a cost of occurrence of the future situation, and outputting the selected proactive action.

19 Claims, 4 Drawing Sheets

PROACTIVE EVENT DRIVEN COMPUTING

BACKGROUND

The present invention, in some embodiments thereof, relates to event processing and, more specifically, but not exclusively, to proactive event processing.

During the last years, event processing has become a common infrastructure for real-time applications which require processing of data streams, such as electronic trading systems, and network monitoring. Event processing systems are capable of detecting complex situations (a context-sensitive composition of messages and events), rather than single events. The functionality is applicable when processing a composition of event sources from a business, application, or infrastructure perspective within different contexts. Sample scenarios relating to SLA alerts and compliance checking are applicable to retail and banking.

An event (e) is an occurrence within a particular system or domain; it is something that has happened, or is contemplated as having happened in that domain. An event type (E) is a specification for a set of events that share the same semantic intent and structure. An event type can represent an event arriving from a producer, or an event produced by an event processing agent (EPA) which is a processing element that applies logic on a set of input events, to generate one or more outputs (derived) events. Events may be raw events and derived events. Derived events are higher-level events in the semantic hierarchy. As an example, bank deposit is an observable event; money laundering is higher level event that is inferred based on specific patterns over these bank deposit events.

An event processing network (EPN) is a conceptual model, describing the event processing flow execution. It consists of a collection of EPAs, producers, and consumers linked by channels. An event channel is a processing element that receives events from one or more source elements (producer or EPA), makes routing decisions, and sends the input events unchanged to one or more target elements (EPA or consumer) in accordance with the routing decisions. The EPN follows an event driven architecture, namely EPAs are communicating in asynchronous fashion by receiving and sending events.

SUMMARY

According to an aspect of some embodiments of the present invention there is provided a method for predicting a future situation based on an analysis of at least one predictive pattern. The method comprises monitoring a plurality of events carried out by an event processing component, detecting a predictive pattern predictive of a future situation, selecting one of a plurality of proactive actions and an execution time for the selected proactive action according to its effect when executed in the execution time on at least one of a probability of occurrence and a cost of occurrence of the future situation, and outputting the selected proactive action.

According to an aspect of some embodiments of the present invention there is provided a system of predicting a future situation based on an analysis of at least one predictive pattern. The system comprises a processor, a monitoring which monitors an event processing component carrying out a plurality of events, a detection module which detects a predictive pattern predictive of a future situation, and a prediction module which identifies a plurality of proactive actions each having an effect on at least one of a probability of occurrence and a cost of occurrence of the future situation and selects, using the processor, one of the plurality of proactive actions according to the effect.

According to an aspect of some embodiments of the present invention there is provided a computer program product for predicting a future situation based on an analysis of at least one predictive pattern. The computer program product comprises a computer readable storage medium, first program instructions to monitor a plurality of events carried out by an event processing component, second program instructions to detect a predictive pattern predictive of a future situation, and third program instructions to select one of a plurality of proactive actions and an execution time according to its effect on at least one of a probability of occurrence and a cost of occurrence of the future situation. The first, second, and third program instructions are stored on the computer readable storage medium.

According to an aspect of some embodiments of the present invention there is provided a method for predicting a future situation based on an analysis of at least one predictive pattern. The method comprises monitoring a plurality of events carried out by an event processing component, detecting a predictive pattern predictive of a future situation, identifying a predefined rule that defines which of a plurality of proactive actions to take in response to the detection from a plurality of predefined rules, and performing the proactive action in response to the detection. The predefined rule is automatically calculated according to an effect of the proactive action on at least one of a probability of occurrence and a cost of occurrence of the future situation in relation to the effect of other the plurality of proactive actions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to event processing and, more specifically, but not exclusively, to proactive event processing.

According to some embodiments of the present invention, there are provided methods and systems of proactively reacting to a future situation that is predicted by an analysis of a stream of events of an event processing component, such as an EPN. The proactive reaction, also referred to as a proactive action, is optionally selected from a set of optional proactive reactions and/or using rules defined according to optional proactive reactions. The selection is optionally made and/or the rule is optionally set according to the effect of each proactive action on the probability of occurrence and/or cost of occurrence of the future situation and/or cost of the action execution. Optionally, the time for performing the proactive action is also calculated in a manner that improves, for example optimizes, a utility function that refers to the probability of occurrence of the future situation and/or the cost of occurrence of the future situation and/or the cost of executing the action. For example, a utility function may be, but is not limited to the expected costs of the event occurrence and the action execution, conditioned on the fact that a particular action is selected for a particular time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
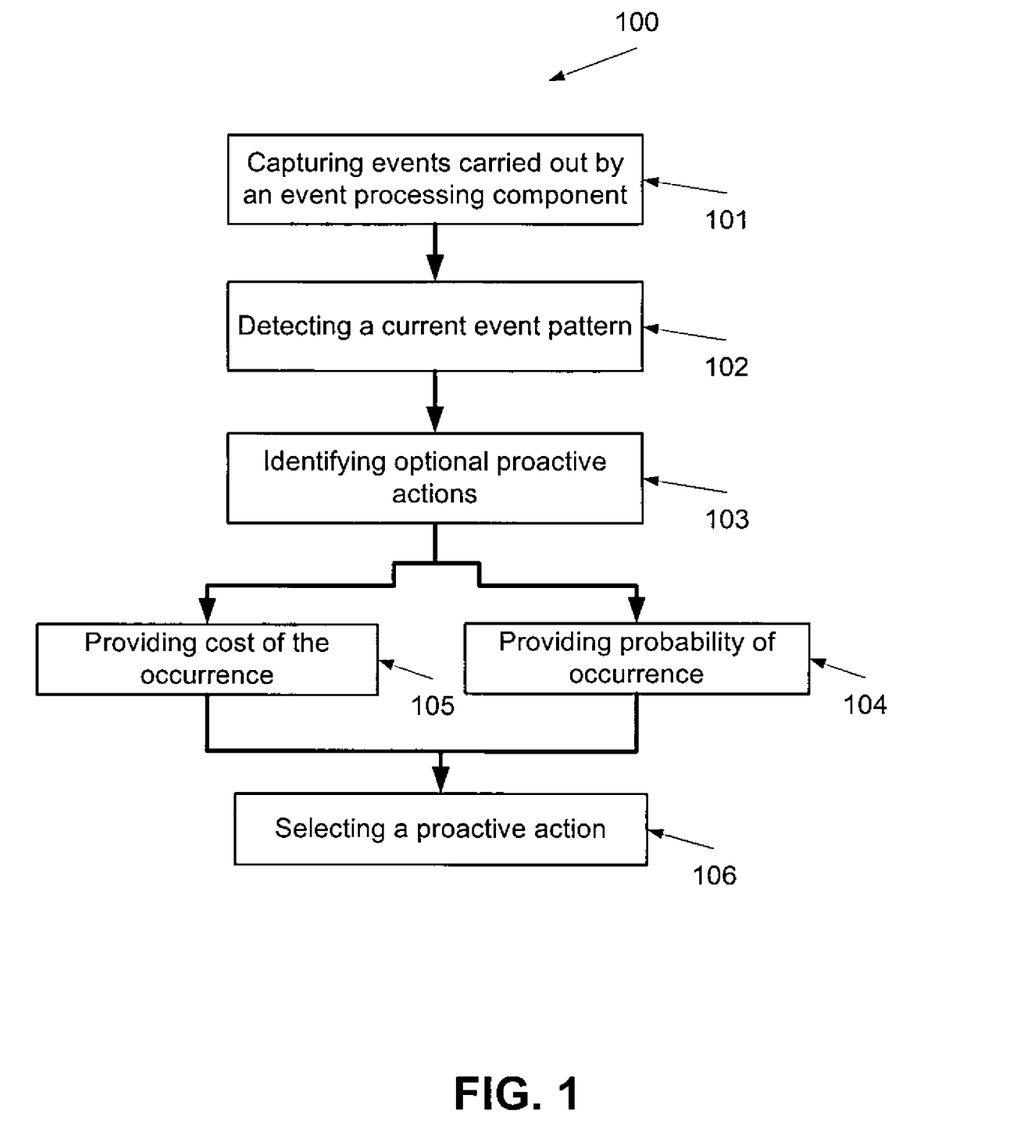
FIG. 1 is a flowchart of a method a flowchart of a method 100 of predicting and reacting to a future situation, such as desired and/or undesired events in an event processing component, according to some embodiments of the present invention.

Reference is now made to FIG. 1, which is a flowchart of a method 100 of proactively reacting to a future situation, such as desired and/or undesired events in an event processing component, according to some embodiments of the present invention. The future situation is detected by analyzing a plurality of events carried out by the event processing component and detecting of a current event pattern, also referred to as a predictive pattern accordingly.

The event processing component is intended to refer to a computer-related entity, a hardware or hardware simulation, a combination of hardware simulation and software, software, or software in execution, wherein a plurality of events are processed by one or more EPAs, optionally in an EPN architecture. For example, an event processing component may be, but is not limited to, a process intended to run on a processor, an executable, a thread of execution, and/or a program. By way of illustration, both an application running on a server and the server can be an event processing component. One or more event processing components may reside within a process and/or a thread of execution and an event processing component may be localized on one computer and/or distributed between two or more computers.

The method 100 is carried out, for example executed, by a computing unit or system, such as a local computing unit or system, for example a desktop, a laptop and/or a remote computing unit, for instance in a cloud computing architecture, or a network environment using a client-server configuration.

Figure 2A:
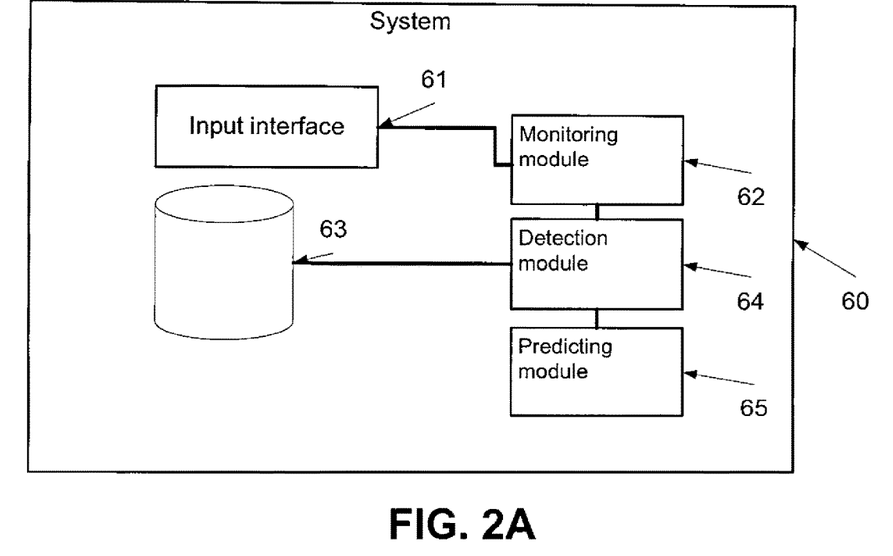
FIG. 2A is a relational view of software components of a system for predicting a future situation based on the detection of a current event pattern in a plurality of events carried out by an event processing component, according to one embodiment of the invention.

Reference is also made to FIG. 2A which illustrates a relational view of software components of a system 60 for proactively reacting to a future situation that is detected according to a predictive pattern appearing in a stream of events carried out by an event processing component, according to one embodiment of the invention. As shown, software components include an input interface 61, a monitoring module 62, a detection module 64, and a predicting module 65. The lines in FIG. 2A depict optional and non limiting data flow between the modules.

Figure 2B:
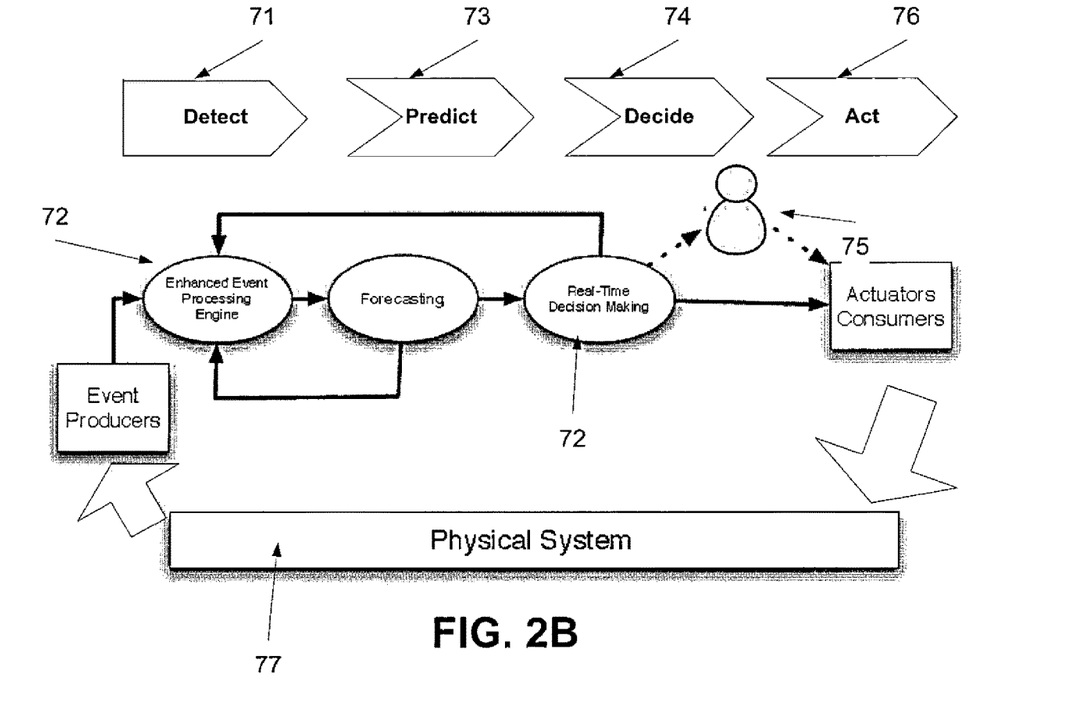
FIG. 2B is a schematic illustration of a model that is operated according to the pattern "detect-forecast-decide-act" to proactively react to future situation of a physical system based on analysis of its events in real time, according to some embodiments of the present invention.

The system 60 may be used as a proactive event-driven system that exploits existing event-based technology to monitor current events and infer future situations based on that information. An exemplary model is described in FIG. 2B, which is a schematic illustration of a model that is operated according to the predictive pattern "detect-forecast-decide-act" to proactively react to future situation of a physical system 77 based on analysis of its events in real time, according to some embodiments of the present invention. First, as shown at 71, predictive patterns are detected, for example by processing current event streams, which may indicate a situation in the future. Optionally, an event-processing engine 72 that is modified and enhanced to handle uncertain and future events is used. Now, as shown at 73, one or more future situations, such as events, that need to be eliminated, mitigated, or intensified are predicted. This may be done based on historical data or any other predictive calculation. This ability is optionally implemented using suitable syntax and semantics of event derivation as supported in most of the common event processing systems. Forecasted events may be further used as input for predictive pattern detection. Now, as shown at 74, suitable proactive action(s) that may be taken ahead of the time of the forecasted event in order to eliminate, mitigate, or intensify the future situation are selected. This is optionally done using real-time decision making or policy adjustment capabilities, for example as described below, with or without human intervention. For example, the decision may be done automatically and/or semi automatically, for instance based on recommendation(s), and/or manually, for instance by an operator 75. Now, as shown at 76, the selected proactive action(s) are taken, optionally by an event-driven platform that makes explicit distinction between consumers and actuators. When the future situation is one or more positive events or opportunities, the proactive system makes sure that the chances the future situation occur increase (for example, a gain opportunity in algorithmic trading).

According to some embodiments of the present invention, an event processing component, such as an EPN component is adjusted to react proactively to future situations which are dedicated in advance. In order to facilitate such proactive decision making, several extensions are made to the EPN architecture. In standard event-processing, events (raw and derived) are transmitted between nodes in the network. Typical derived events are not directly observable, but are inferred by the event processing system. Forecasted events, in contrast, may be derived and observable. Optionally, in these embodiments at least some of the events are forecasted events wherein each has an occurrence time that may be derived and set to a future time, meaning the occurrence time of the derived event is later than its detection time. Both the ability to derive occurrence time and set it to future time is an extension for the notion of derived event. Both the occurrence of the forecasted event, and the time of occurrence, may be uncertain and therefore characterized probabilistically.

Optionally, a proactive agent (PRA) is added to the event processing model of the EPN. The PRA is optionally an EPA in that it receives events as input and its activation is triggered by the arrival of such an event. The PRA optionally encapsulates a decision logic that may range from using predetermined decision trees to solving a multi-objective optimization in highly dynamic environments, for example as described below.

Optionally, an additional type of a player is added to the event processing primitives: actuator. Unlike consumer which receives events, actuator receives directives to perform actions, where the responsibility on the selection of the action and its activation timing is part of the proactive model. Thus, the proactive actions are an integral part of the model along with their relevant characteristics. Note that actuators may be either autonomous actuators, or soft actuators that require human in the loop.

First, as shown at 101, the system 60, for example the input interface 61, captures a plurality of events, for example an event stream, carried out by an event processing component to be inspected by the monitoring module 62. The monitoring is performed in real time, during the operation of the event processing component.

Then, as shown at 102, a current event pattern predictive of a future situation is detected by analyzing the events, for example by the detection module 64. The predictive pattern may be indicative of a future situation, optionally inevitable, optionally problematic or desired. Future situations may be negative, for example system malfunctions, or positive events, for example opportunities. In such an embodiment, the goal may be to select a proactive action that increases the chances that the opportunity is captured (for example, a gain opportunity in algorithmic trading). The future situation may be the occurrence of a single forecasted event, referred to herein as a target event, or a set of events, for example a sequence. It should be noted that most examples herein related to avoiding and/or reducing the effect of negative events; however, increasing the probability of occurrence of positive events may be similarly encouraged.

As used herein, a future situation is defined as one or more future events which the occurrence thereof is forecasted by the detection of one or more predictive patterns (with probabilistic characterization in a form of distribution over a time range), there is a finite (relatively small) set of feasible proactive actions, optionally known at design time, for potentially reducing and/or increasing the probability thereof, and there one or more cost functions associated both with the future situation and with each feasible proactive action.

As demonstrated by Y. Engel and O. Etzion. Towards proactive event-driven computing. In Proceedings of the 5th ACM international conference on Distributed event-based system, pages 125-136, 2011, proactive event-driven computing may be applied in many different domains for inherently different applications. For clarity, a proactive action is an action that:

1. aims to eliminate a forecasted event or to mitigate or increase the effect of the forecasted event;
2. there are one or more predictive patterns, whose occurrence forecasts that the forecasted event will occur (with probabilistic characterization in a form of distribution over a time range); and
3. there are one or more cost functions associated with the forecasted event and/or the action.

The proactive action is optionally part of a finite set of feasible actions, known at design time, each potentially reducing the probability of the forecasted event.

As shown at 103, proactive actions which may be performed to decrease or to increase a probability of occurrence of the future situation are identified. For example, the system 60 includes a database 63 with a set of records, each associate between a future situation and one or more optional proactive actions. In use, a record associated with the identified future situation may be retrieved from the database and the one or more possible proactive actions may be extracted.

As shown at 104, for each proactive action, a probability of occurrence of the future situation after the proactive action is taken is provided, for example calculated or extracted from a database. For example, this probability of occurrence is a probability distribution over the occurrence time of the future situation conditioned on the detection of the predictive pattern. This distribution predicts the probability that the future situation, denoted herein as $\varepsilon$, occurs within a specific time frame of the detection of predictive pattern. To describe this probability we employ terminology from survival analysis: an event density function (EDF) of future situation, denoted here by $g^\varepsilon(t)$, indicates the probability that $\varepsilon$ occurs at time t, which is here measured relative to the detection of $\varepsilon$. The cumulative distribution function (CDF) of g is denoted by $G^\varepsilon(t)$, and is called the lifetime distribution function (LDF) of $\varepsilon$. $G^\varepsilon(t)$ indicates the probability that $\varepsilon$ occurs between a time zero and t. By using the terms EDF and LDF, we assume that $\varepsilon$ is bound to occur between now and eternity. This is true for most cases (events such as machine failure, resource depletion, or even traffic jam); when this is not the case $g^\varepsilon(t)$ may be replaced with two parameters: $p^\varepsilon$ denotes a probability of $\varepsilon$ ever occurring, and $f^\varepsilon(t)$ denotes EDF: a distribution over the time $\varepsilon$ occurs, given that $\varepsilon$ occurs until eternity. In that case the following is set $g^\varepsilon(t)=f^\varepsilon(t)p^\varepsilon$ and proceed as before.

Obtaining the EDF allows association with survival analysis and provides general guidelines on how this could be done. Assuming the availability of past data, in which both $\varepsilon$ and the predictive pattern, denoted herein as $\pi$, may be identified and timestamped, an EDF relative to the occurrence time of $\pi$ may be obtained using a standard regression model; however, practical models ultimately differ significantly between domains.

Figure 3:
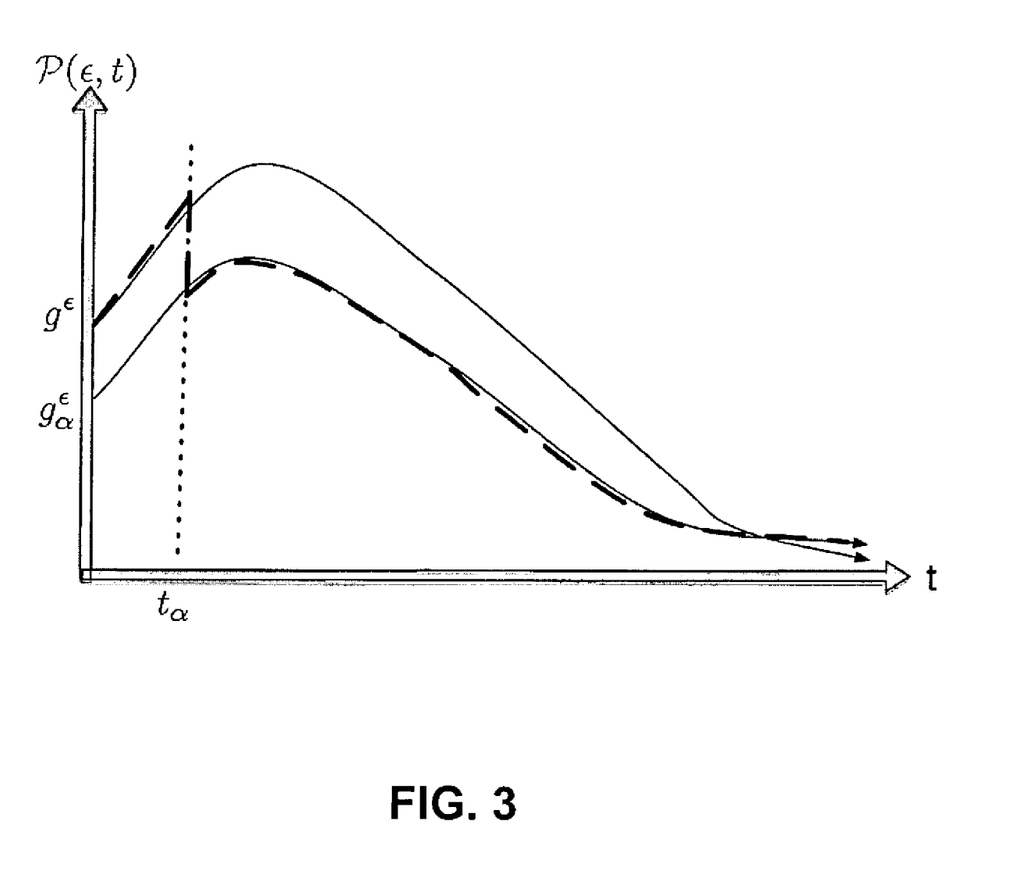
FIG. 3 is a graph depicting an exemplary probabilistic structure wherein the probability a future situation is measured according to a distribution, according to some embodiments of the present invention.

A possible proactive action $\alpha$ is applied to reduce or increase the probability of an undesired event. If the application of $\alpha$ before $\varepsilon$ does not prevent $\varepsilon$ from happening with certainty, $\alpha$ is associated with a new event density function $g_\alpha^\varepsilon(t)$. Now, $g^\varepsilon(t)$ is the probability that $\varepsilon$ occurs at t, assuming no action is taken until time t, whereas $g_\alpha^\varepsilon(t)$ is the probability that $\varepsilon$ occurs at t, assuming $\alpha$ is taken until t. FIG. 3 is an exemplary probabilistic structure wherein $\varepsilon$ is measured according to the distribution $g^\varepsilon(t)$. At time $t_\alpha \alpha$ is applied and afterwards the probability is measured according to $g_\alpha^\varepsilon(t)$. As indicated in FIG. 3, the probability that $\varepsilon$ occurs throughout the time window is measured under the combination of the two, depicted by the broken line.

This model assumes that $\alpha$ reduces the probability that $\varepsilon$ occurs and this is independent of the processes causing $\varepsilon$. For example, an action that adds computing resources to the server is independent of the steady increase of incoming requests during a DoS attack; the latter has lower probability to cause a failure if resources are added, as long as this action is taken prior to the failure. An alternative model, in which there is dependency between the two, is also possible. Under the alternative model, the distribution $g_\alpha^\varepsilon(t)$ is taken with respect to the time $\alpha$ is taken. The language and the algorithms presented herein may be adapted to the second model.

As shown at 105, for each proactive action, a cost of the occurrence of the future solution with, after, and/or before the respective proactive action is provided, for example calculated or extracted from a database. This allows taking informed decisions hinged on the ability to measure the cost. Optionally, the cost takes into account a combination between the cost of the event in case it occurs and the cost of performing the respective proactive action.

For brevity, an either positive or negative reward is assumed to be associated with $\varepsilon$ and a cost function associated with each action. Optionally, a cost of an action is calculated as a function of time as actions often effect operation until some specific future time (for example, shutting down the server until the danger is over, or taking machinery down to maintenance and losing the rest of the working week). In that case, the cost is a decreasing function in the activation time. If the cost of a proactive action is constant, than the choice is between not activating it and activating it immediately when the rule is triggered; there is no point in waiting. If the cost of a proactive action is zero, the proactive action is applied automatically when a relevant rule (according to which the proactive action reduces the probability of an undesirable event, or increases the probability of a desired event) is triggered.

For particular applications, the cost function may express slightly different meanings. For example, if $\alpha$ cannot prevent $\varepsilon$, but it reduces the cost of its occurrence, optionally with certainty, then the cost of the proactive action may include the cost of the occurrence of the event after the application of α. Similarly, the cost of ε may include the cost of applying α after the event ε occurred (in case we did not manage to time α as a preventive measure before ε, but the proactive action is still required as a remedy), or any difference between the benefit of applying α before vs. after ε occurs.

For example, a certain stock is set to be sold at a certain price if some negative event happens in the market; selling the stock before the event occurs is much more beneficial than after it happens. In such case a cost, denoted as C, represents an estimation of the amount the stock's value loses when the event occurs.

The notion of proactive situation contains the information needed for the proactive action to receive its decisions. Formally:

A proactive situation where a prediction of future events based on current events, may be denoted by a tuple $\sigma=(\epsilon; C_\epsilon, T; \mathcal{T}; C)$, where ε is an event, $C_\epsilon$ denotes the cost incurred by the occurrence of ε, T denotes an expiration time, and $\mathcal{T}$ is a set of responses.

A response $\mathcal{T} \in \mathcal{T}$ is a tuple $(\alpha; g^\epsilon\alpha; \delta_\alpha)$ where α denotes an action identifier, denotes $g^\epsilon\alpha$ a density function of ε given that α is in effect, and $\delta_\alpha$ denotes a delay namely the time it takes to α as a function of time it is applied. $\mathcal{T}$ always includes one or more responses (i.e. default responses) in which the proactive action α is no action. Such a response may be denoted as $(\emptyset, g^\epsilon(t), 0, p^\epsilon)$. Finally, the cost function $C_\alpha:[0,T] \Rightarrow \mathfrak{R}$ indicates the cost of performing α as a function of the time.

Optionally, the detection of a certain predictive pattern indicates a higher risk for the occurrence of ε in a future period where T denotes a parameter that defines the future period in the context of the predictive pattern. After T, the effect of detecting the predictive pattern fades, and the probability of occurrence of ε returns to normal. Beyond that, T may be used to indicate a waiting period before an application of an action is costless (for example, the end of a minute, an hour, working day, a week, a month or any intermediate or longer period). Optionally, T bounds the horizon of the decision problem. T may be specified relative to the detection of the predictive pattern, or as an absolute time. In the latter case the relative T is calculated each time the rule is triggered.

The predictive pattern is optionally not a precondition to ε. Most systems support a default policy that works well as long as no rare negative event occurs. Under those normal conditions, the rare event of interest (ε), may have some non zero probability to occur. The proactive model allows such a system to adapt its policy automatically when the probability of a future event changes, optionally significantly (i.e. above a predefined threshold), see setting in R. Brafman, C. Domshlak, Y. Engel, and Z. Feldman, Planning for operational control systems with predictable exogenous events, in AAAI, 2011. Optionally, a proactive action includes a combination of a plurality of proactive actions.

Now, as shown at 106, one or more of the plurality of proactive actions are selected according to the probability of occurrence and optionally the cost, which are calculated per proactive action, optionally continuously during a period lasting until the future situation occurs. For brevity, reference is made to a selected proactive action; however, a selected proactive action may be a combination of different single proactive actions.

Optionally, 104-106 are implemented as a set of rules that defines which proactive action should be taken in response to a certain predictive pattern. In such an embodiment, the rules may be generated in advance, as described below based on the above. The rules may be documented in a PRA, for example as described above.

For example, the selection is made according to a rule that indicates that if a predictive pattern is detected, there is a specific probability that it is followed by some event ε with cost $C_\epsilon$. A rule also specifies actions that may be taken to change that probability, and also the distribution of the occurrence time. The question is "what is the optimal decision given this new information?". Optionally, a decision includes not only which action to take, but also when to take it. The assumption is that the cost of taking the proactive action changes over time. In many cases, the proactive actions involve some form of shutdown of a machine or a service, until some fixed time (with respect to the detection of the predictive pattern) for example the end of a working day or the time in which the danger of attack is back to normal. When this is the case, the optimal timing to perform a proactive action may be later than the time predictive pattern is detected. Optionally, this problem of taking action ahead of time, under uncertainty, is viewed from a decision theoretic perspective so that a decision is taken by optimizing a utility in expectation, weighing the risk of doing nothing when the negative event eventually occurs (false negative), against the cost of taking action when the event does not eventually occur (false positive).

According to some embodiments of the present invention, the time of applying the proactive action is taken as part of the proactive action definition, hence making the proactive action space continuous instead of a state space. This solves the problem of continuity. Optionally, a decision is taken in only one state, and thus the continuity of the proactive action space allows obtain an optimal policy using continuous optimization methods. For example, the decision is made according to a Markov decision process (MDP). For brevity, MDP is denoted herein as M=tuple $(S_M; A_M; T_M; R_M)$ where $S_M$ denotes a set of states, $A_M$ denotes a set of optional proactive actions, for example the optional proactive actions identified for the future situation, $R_M: S \rightarrow R$ denotes a reward function, and $TM: S_M \times A_M \times S_M \rightarrow [0;1]$ denotes a transition function with $T_M(s; \alpha; s')$ capturing a probability of reaching s' by applying action $\alpha \in A_M$ in state s; for each $(s;\alpha) \in S \times A_M$, $$\sum_{s' \in S_M} T_M(s, \alpha, s') = 1$$

It should be noted that a solution to MDP is a policy a mapping $\psi: S_M \Rightarrow A_M$ from states to actions; with a policy, an EPA of the event processing component knows which optimal action to perform in any state it reaches. Because transitions are uncertain, the actual sum of rewards a policy obtains is not known in advance; a potentially different reward may be obtained in each execution. A policy is therefore evaluated according to its expected utility: the expectation on the value of the random variable defined as the sum of rewards obtained by using the policy. This expectation can be defined recursively using the following Bellman equation. $U^\psi(s)$ denotes an expected utility of a policy, starting from state s; then:

$$U^\psi(s) = R_M(s) + \sum_{s'} U^\psi(s') T_M(s, \psi(s), s') \qquad \text{Equation 1}$$

where a reward is received in a current state.

Figure 4A:
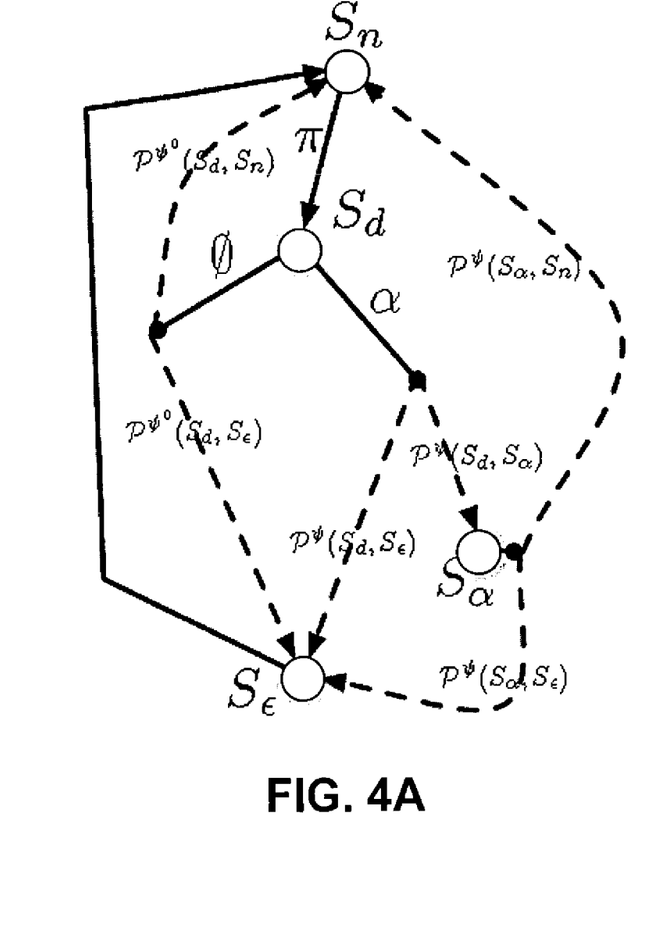
FIGS. 4A and 4B depicts states and paths there between, according to some embodiments of the present invention.

Reference is now made to an exemplary MDP solution for calculating a decision. For clarity, a single possible action α where δα=0 is assumed. The space of solutions in such a setting may consist of four states, for example as depicted in FIG. 4A. A normal state ($S_n$) is in place as long as no rule is triggered. When π is detected, and hence the rule δ→σ is triggered, the space moves to a alert state ($S_d$), a state wherein an occurring event denoted as $S_\varepsilon$, and the state we reach after applying action α in state $S_d$ is denoted as $S_\alpha$, to return to $S_n$ at time T state. The policy maps each state to an action to be taken in case that state is reached. In this setting, and optionally only in this setting, in $S_d$ a decision among several courses of proactive actions in $S_d$ is taken.

Optionally, the time of the proactive action is set by the policy so that the policy determines an action-time pair: which action to take, at what time. Given a single α, the policy determines whether to apply α, and if so when to apply it ($t_\alpha$). As depicted in FIG. 4A, the arrow marked with α and exiting state $S_d$, represents not a single possible action, but a space of possible actions (α;$t_\alpha$). The transition model of taking action (α;$t_\alpha$) in state $S_d$ is as follows: with some probability the event occurs before α is taken and the state changes to $S_\varepsilon$ and with a complementary probability the future situation does not occur before the proactive action is taken and hence the $S_\alpha$. Optionally, in state ε ($S_\varepsilon$) penalty of $C_\varepsilon$ is incurred. In $S_\alpha$, the only possible action is no action. From there the event may occur with some lower probability (results in $S_\varepsilon$) or not occur with the complementary probability (results in moving to state $S_n$ at time T). It is also possible to take no action in $S_d$ and to transition to $S_\varepsilon$ with some probability and to $S_n$ with a complementary probability.

Optionally, in order to optimize the MDP policy, an expression that evaluates any given policy is built and used to determine the value of state $S_d$ under any policy; the policy that maximizes this value as an optimal policy. In such a manner, the policy evaluation problem is simplified. As by time T the state is Sn, each round in which we reach $S_d$ may be considered as an independent epoch. A policy that maximizes the utility for a single epoch also achieves an optimal average utility for infinite horizon.

With the finite horizon, the MDP is solved using a backwards induction: where the utility of the states is calculated at the end of the horizon (only $S_n$); next, the utility of states is calculated one step back, using equation 1, and continue back in time until the utility of the current state at the current time is obtained. This allows building an expression that evaluates a policy ψ under a specific model. Initially, we consider any ψ under which α is applied (rather than taking "no action").

As there is no cost (or benefit) at $S_n$, $U^\psi(S_n)$=0. In $S_\alpha$ a penalty of $C_\alpha$ is incurred so that $U^\psi(S_n)$=-$C_\varepsilon$. In $S_\alpha$ a penalty of $C_\alpha$ ($t_\alpha$) is incurred, and given the probability to move to $S_\varepsilon$ the policy evaluation of equation 1 yields:

$$U^\psi(S_\alpha) = -C_\alpha(t_\alpha) + \mathcal{P}^\psi(S_\alpha, S_\varepsilon)(-C_\varepsilon) \qquad \text{Equation 2}$$

Finally, in state $S_d$ there is no penalty in the state itself, and the utility is computed Equation 1 as follows:

$$U^\psi(S_d) = \mathcal{P}^\psi(S_d, S_\alpha) U^\psi(S_\alpha) + \mathcal{P}^\psi(S_d, S_\varepsilon) U^\psi(S_\varepsilon) = \mathcal{P}^\psi(S_d, S_\alpha)(C_\alpha(t_\alpha) + \mathcal{P}^\psi(S_\alpha, S_\varepsilon)(C_\varepsilon)) - \mathcal{P}^\psi(S_d, S_\varepsilon) C_\varepsilon \qquad \text{Equation 3}$$

Figure 4B:
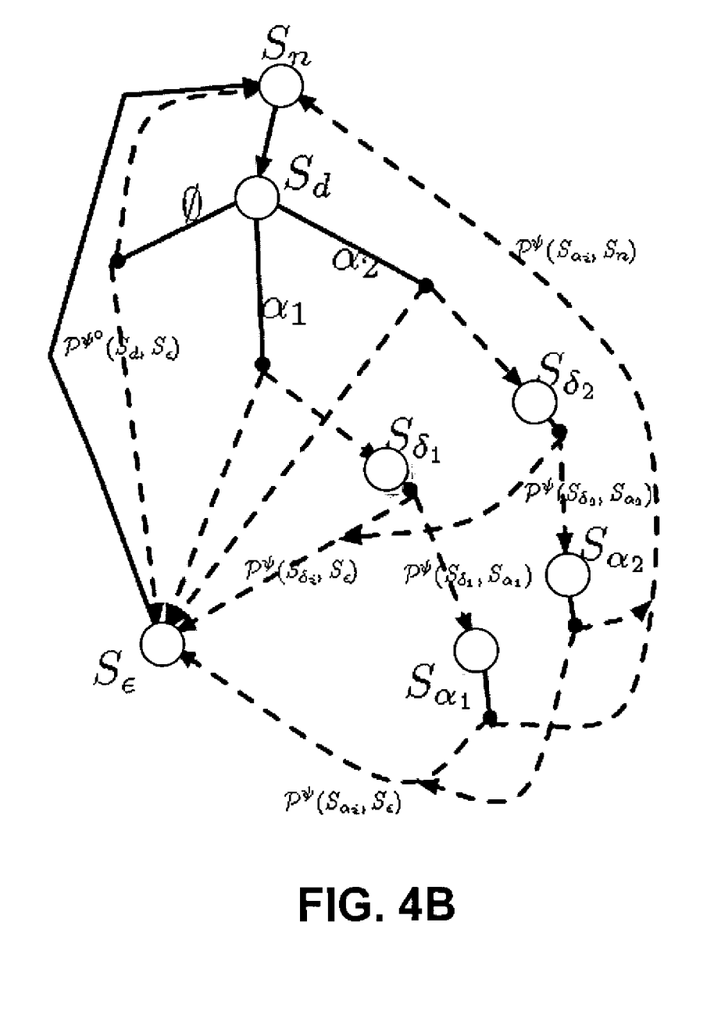

FIG. 4B depicts how this model is extended to multiple actions, and to non-zero delays. A state $S_{\alpha i}$ is designated for each action αi and adds a state $S_{\delta i}$ associated with the delay of each action. As in FIG. 4A, an arrow marked αi (e.g. $\alpha_1$ and $\alpha_2$) represents a space of possible actions (αi; $t_{\alpha i}$). When extending the backward induction to include the extensions the detailed process may be omitted, and the result which is analogous to the following:

Equation 4:

$$U^{\psi i}(S_d) = \mathcal{P}^{\psi i}(S_d, S_{\delta i})(C_{\alpha_i}(t_{\alpha_i}) + C_\varepsilon(\mathcal{P}^{\psi i}(S_{\delta i}, S_\varepsilon) + \mathcal{P}^{\psi i}(S_{\delta i}, S_{\alpha_i}) \mathcal{P}^{\psi i}(S_{\alpha_i}, S_\varepsilon))) - \mathcal{P}^\psi(S_d, S_\varepsilon) C_\varepsilon \qquad (4)$$

where $\psi^0$ denotes a policy of taking no action. Simple backward induction for this policy yields:

Equation 5:

$$U^{\psi^0}(S_d) = \mathcal{P}^\psi(S_d, S_n) U^{\psi^0}(S_n) + \mathcal{P}^{\psi^0}(S_d, S_\varepsilon) U^{\psi^0}(S_\varepsilon) = -\mathcal{P}^{\psi^0}(S_d, S_\varepsilon) C_\varepsilon \qquad (5)$$

The optimal policy ψ* may be obtained by maximizing $U^{\psi i}(S_d)$ over all pairs ($\alpha_i$; $t_{\alpha i}$) and comparing with $U^{\psi^0}(S_d)$, for example as follows:

$$\psi^* = \arg\max_{\psi \in \psi_i, \psi^0} U^\psi(S_d) \qquad \text{Equation 6}$$

Briefly stated, the results of backward induction are the formulas for expected utility functions (see equations 4 and 5). Therefore, optimally taking the decision may be done by finding a maximum of these functions for each action, and choosing the best between them, for example as described in Equation 6.

Optionally, expressions are obtained for transition probabilities that allow expressing equations 4 and 5 in terms of the components of a proactive situation to enable solving equation 6. Optionally, the transition probabilities are all derived from the probability of the event occurrence. As set above, ψ is the policy to apply action α at time $t_\alpha$ conditioned of course on the event ε not occurring beforehand. $P^\varepsilon(t_1; t_2)$ denotes a probability that ε occurs within the time interval ($t_1$; $t_2$), conditioned on not occurring until time $t_1$. The conditioning allows defining being in a certain state, allowing measuring transition probabilities from a state s when in state s. Furthermore, $P^\varepsilon_\alpha(t_1; t_2)$ denotes the same probability as $P^\varepsilon(t_1; t_2)$, assuming the proactive action α has taken effect exactly at time $t_1$. $P^\varepsilon(t_1; t_2)$ may be calculated in terms of the parameters we model in the language.

Based on the above definitions, the following take place:

$$P^\varepsilon(t_1, t_2) = \frac{G^\varepsilon(t_2) - G^\varepsilon(t_1)}{1 - G^\varepsilon(t_1)}$$

where for $P^\varepsilon_\alpha(t_1; t_2)$ the conditioning (denominator) takes into account the fact that until the proactive action occurrence at $t_1$, the distribution in place was $G^\varepsilon$:

$$P^\varepsilon_\alpha(t_1, t_2) = \frac{G^\varepsilon_\alpha(t_2) - G^\varepsilon_\alpha(t_1)}{1 - G^\varepsilon(t_1)}$$

where $t_0$ denotes a time of detection of π (or the time of transitioning from $S_n$ to $S_d$). The transition probabilities from $S_d$ to $S_\varepsilon$ or $S_\delta$ or $S_{\delta i}$ are:

$$\mathcal{P}^{\psi i}(S_d, S_\varepsilon) = P^\varepsilon(t_0, t_{\alpha i})$$

$$\mathcal{P}^{\psi i}(S_d, S_{\delta i}) = 1 - P^\varepsilon(t_0, t_{\alpha i}).$$

To proceed from δi to a probabilities are as follows:

$$\mathcal{P}^{\psi_i}(S_{\delta_i}, S_{\alpha_i}) = P^\varepsilon(t_{\alpha_i}, t'_{\alpha_i}),$$

where $t'_{\alpha_i} = t_{\alpha_i} + \delta_{\alpha_i}$. The state changes $S_{\alpha_i}$ if ε does not occur between the time the proactive action is applied and the time it takes effect.

The transition from $S_{\delta_i}$ to $S_\varepsilon$ occurs with the complementary probability. Finally, for $\psi_i$, the distribution over the event occurrence in $S_{\alpha_i}$ is denoted by:

$$\mathcal{P}^{\psi_i}(S_{\alpha_i}, S_\varepsilon) = P_{\alpha_i}^\varepsilon(t_{\alpha_i}, T)$$

where $P^{\psi 0}(S_d, S_n)$ is a complementary probability. When substituted in equation 4, an expression for the utility of any policy $\psi$ and the policy $\psi^0$ is obtained as follows:

Equation 7:

$$U^{\psi_i}(S_d) = (1 - P^\varepsilon(t_0, t_{\alpha_i}))(-C_{\alpha_i}(t_{\alpha_i}) - C_\varepsilon(P^\varepsilon(t_{\alpha_i}, t'_{\alpha_i}) + (1 - P^\varepsilon(t_{\alpha_i}, t'_{\alpha_i}))P_{\alpha_i}^\varepsilon(t'_{\alpha_i}, T))) - P^\varepsilon(t_0, t_{\alpha_i})C_\varepsilon \quad (7)$$

According to some embodiments of the present invention, the monitored events are uncertain events. For instance, the events are based on noisy sensor readings. This means that input events based on which a predictive pattern detection is issued are uncertain; this can be represented using a measure of probability of occurrence on the event itself. The uncertainty affects the probability the events can predict of future situation. As explained above, predictive patterns are complex combinations of input events. Optionally, the predictive pattern language is indicative of the probability that the predictive pattern is detected as a function of the probability of the input events, for example by attaching a probability measure to each event. For example, consider a predictive pattern π with two event types, $E_1$ and $E_2$, from two independent sources. The predictive pattern is the appearance of both $E_1$ and $E_2$ are encountered during a given time window. Assume two uncertain instances are detected, one of each event, denoted by $e_1$ and $e_2$ and carry probability measures $P(e_1)$ and $P(e_2)$. Given independence of random variables $e_1$ and $e_2$, the probability to encounter the sequence is $P_\pi = P(e_1)P(e_2)$. This calculation becomes more complicated when multiple observations $e^j i$ and $e^k i$ regarding the same event type $e_i$ occur. When $e^k i$ overrides $e^j i$ namely updates the probability that $e_i$ occurred, the latest observation also determines the occurrence time of the prospect event. With this semantics a single instance calculation may be resorted back as above. In another case, for a specific event type $e_i$, independent observations to two different (possible) instances of $e_i$ are made: ($e^j i$; $P(e^j i)$) at time $t_j$, and ($e^k i$; $P(e^k i)$) at time $t_k$. The observations may be distinguished using instance identifiers (IDs).

For the case of independent observations the probability and occurrence time of an instance has to be determined. For simple predictive patterns this probability may be computed analytically. For example, when detecting the sequence ($e^1_1$; $e^2_1$; $e_2$), then $$P_\pi = (P(e_1^1) + P(e_1^2) - P(e_1^1)P(e_1^2))P(e_2)$$

The probability of complex predictive patterns may be computed by sampling. N series of instances is generated by sampling from the probability of the events in the sequence. The number of samples is counted, out of the N series, in which π occurred.

This ratio is an estimate of $P_\pi$.

Continuing the example above, consider the input stream ($e^1_1$; $e^2_1$; $e^1_2$; $e^2_2$) the detection of π occurs twice: once after receiving $e^1_2$ and again after receiving $e^2_2$. The probability $P_\pi$ now combines the probability of the two observations, $e^1_2, e^2_2$ but it is not obvious to determine the occurrence time $t_0$ that should be associated with π. This occurrence time is of course instrumental in determining the timing of a possible action. A reasonable solution is to take expectation over the time (an average over the time stamps from the candidate observations, each weighted by the probability associated with that observation).

Finally, the semantic of $g^\varepsilon(t)$ is the probability of ε given that the predictive pattern π occurred. $g'_\varepsilon(t) = g^\varepsilon(t)P_\pi$ may now be defined to get the probability of ε given the probabilistic observation of π. And g(t) may be replaced with $g'_\varepsilon(t)$ in any reasoning task.

According to some embodiments of the present invention, the probability of the future situation ε is continuously calculated as a function of one or more dynamic characteristics. An exemplary characteristic is temperature where a higher temperature is identified with a higher malfunction rate, the probability of occurrence is updated continuously and respectively according to the measured temperature.

For example, $\pi_x$ denotes a parameterized predictive pattern where π denotes a predictive pattern and x denotes a number of rejections that were actually encountered within a certain context. As an example, LDF is assumed as exponential and parameter x may affect the steepness of the distribution as follows:

$$G^{\varepsilon,x}(t) = 1 - e^{-tx}$$

where parameters are specified within a predictive pattern definition (possibly with lower or upper bounds) and used in the functional expression of $G^\varepsilon$ and $G^\varepsilon \alpha$.

It should be noted that the actual probability of ε is associated with a particular rule and therefore $G^\varepsilon$ and $G^\varepsilon \alpha$ are calculated in real time.

In use, when a nine is triggered by identification of a predictive pattern, actual probability distributions arc calculated. Optionally, a proactive agent encapsulates this logic and executes a reasoning algorithm any time it receives a new forecasted event whose probability is different than before. The algorithm is executed each time either an observation is received with new probability, or an event changes a parameter in a previously detected predictive pattern. Each time the algorithm is executed, the action-time pair (α; $t_\alpha$) it prescribes may of course be updated. In particular, it is possible that we decide to perform α at time $t_\alpha$, and before time $t_\alpha$, the action time is postponed. An action is therefore performed in the earliest time t in which $t = t_\alpha$; that is, when the time to perform an action is reached without an event occurring in between causing this time to be postponed. The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a database, and an interface is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for predicting a future situation based on an analysis of at least one predictive pattern, comprising:
    monitoring a plurality of events carried out by an event processing component;
    detecting a predictive pattern predictive of a future situation;
    selecting one of a plurality of proactive actions and an execution time for said selected proactive action according to its effect, when executed in said execution time, on at least one of a probability of occurrence and a cost of occurrence of said future situation; and
    outputting said selected proactive action;
    wherein said plurality of proactive actions are documented in a database and designated for potentially reducing or increasing a probability of occurrence of said future situation.

2. The method of claim 1, wherein said selecting is performed according to a rule defining said selected proactive action as a response to said predictive pattern.

3. The method of claim 1, wherein said selecting comprises calculating for each said proactive action in at least one execution time a combination between said probability of occurrence of said future situation and said cost of occurrence of said future situation and performing said selecting according to said calculating.

4. The method of claim 1, wherein said cost of occurrence changes as a function of time during a period lasting until said future situation is estimated to occur, said selecting comprises calculating said effect in a plurality of instances during said period.

5. The method of claim 1, wherein said probability of occurrence changes as a function of time during a period lasting until said future situation is estimated to occur, said selecting comprises calculating said effect in a plurality of instances during said period.

6. The method of claim 1, wherein said cost changes as a function of time during a decision epoch.

7. The method of claim 1, wherein said probability of occurrence dynamically changes during said monitoring while said future situation is continuously calculated as a function of at least one dynamic characteristic of said event processing component and dynamic parameter that effects said event processing component.

8. The method of claim 1, wherein said predictive pattern defines at least one event marked with a measure of probability of event occurrence; wherein said probability of occurrence of said future situation is calculated according to said measure of said at least one event.

9. The method of claim 1, wherein said selecting comprises calculating said effect for each said proactive action in real time, in response to said detecting.

10. The method of claim 1, wherein said selecting comprises estimating said effect for each said proactive action in a plurality of future instances; wherein said selecting comprises selecting in which of said plurality of future instances to perform said selected proactive action.

11. The method of claim 10, wherein said cost of occurrence calculated by taking into account a cost of performing said selected proactive action at a respective said future instance.

12. The method of claim 1, wherein said cost of occurrence is a combination of a first cost of performing said selected proactive action and a second cost of the effect of said future situation on the activity of said event processing component after said selected proactive action is performed.

13. The method of claim 1, wherein said probability of occurrence is a probability distribution over an occurrence time of said future situation conditioned on the detection of said predictive pattern.

14. The method of claim 1, wherein said selecting comprises applying a Markov decision process (MDP) on said plurality of proactive actions.

15. The method of claim 14, wherein said MDP is solved using a backwards induction.

16. The method of claim 1, wherein said selected proactive action is a combination of a plurality of proactive actions.

17. A system of predicting a future situation based on an analysis of at least one predictive pattern, comprising:
a processor;
a monitoring which monitors an event processing component carrying out a plurality of events;
a detection module which detects a predictive pattern predictive of a future situation;
a database which stores a plurality of records each of one of a plurality of proactive actions designated for potentially reducing or increasing a probability of occurrence of said future situation; and
prediction module which identifies a plurality of proactive actions each having an effect on at least one of a probability of occurrence and a cost of occurrence of said future situation and selects, using said processor, one of said plurality of proactive actions according to said effect.

18. A computer program product for predicting a future situation based on an analysis of at least one predictive pattern, comprising:
a non transitory computer readable storage medium;
first program instructions to monitor a plurality of events carried out by an event processing component;
second program instructions to detect a predictive pattern predictive of a future situation; and
third program instructions to select one of a plurality of proactive actions and an execution time according to its effect on at least one of a probability of occurrence and a cost of occurrence of said future situation;
wherein said first, second, and third program instructions are stored on said computer readable storage medium;
wherein said plurality of proactive actions are documented in a database and designated for potentially reducing or increasing a probability of occurrence of said future situation.

19. A method for predicting a future situation based on an analysis of at least one predictive pattern, comprising:
monitoring a plurality of events carried out by an event processing component;
detecting a predictive pattern predictive of a future situation;
identifying a predefined rule that defines which of a plurality of proactive actions to take in response to said detection from a plurality of predefined rules; and
performing said proactive action in response to said detection;
wherein said predefined rule is automatically calculated according to an effect of said proactive action on at least one of a probability of occurrence and a cost of occurrence of said future situation in relation to the effect of other said plurality of proactive actions;
wherein said plurality of proactive actions are documented in a database and designated for potentially reducing or increasing a probability of occurrence of said future situation.

* * * * *